United States Patent
Maldonado-Perez

(10) Patent No.: US 12,382,975 B1
(45) Date of Patent: Aug. 12, 2025

(54) METHOD OF PREPARING A FIRST BREAK WHEAT WHICH MAINTAINS WHEAT GERM INTACT AND SURROUNDED IN A PROTECTED STATE BY ENDOSPERM

(71) Applicant: Alfonso Maldonado-Perez, Panama City, FL (US)

(72) Inventor: Alfonso Maldonado-Perez, Panama City, FL (US)

( * ) Notice: Subject to any disclaimer, the term of this patent is extended or adjusted under 35 U.S.C. 154(b) by 223 days.

(21) Appl. No.: 17/899,695

(22) Filed: Aug. 31, 2022

Related U.S. Application Data

(60) Provisional application No. 63/339,324, filed on May 6, 2022.

(51) Int. Cl.
| | | |
|---|---|---|
| *A23J 1/12* | (2006.01) | |
| *A23J 3/18* | (2006.01) | |
| *B02B 3/04* | (2006.01) | |
| *C08B 30/04* | (2006.01) | |

(52) U.S. Cl.
CPC . *A23J 1/12* (2013.01); *A23J 3/18* (2013.01); *B02B 3/04* (2013.01); *C08B 30/046* (2013.01)

(58) Field of Classification Search
CPC ...... A23J 1/12; A23J 3/18; B02B 3/04; C08B 30/046
USPC .......................................................... 426/483
See application file for complete search history.

(56) References Cited

U.S. PATENT DOCUMENTS

| | | |
|---|---|---|
| 3,832,472 A | 8/1974 | Rodgers |
| 3,945,312 A | 3/1976 | Borisov et al. |
| 4,133,899 A | 1/1979 | Wolffing et al. |
| 4,244,980 A | 1/1981 | Fischer et al. |
| 4,741,913 A | 5/1988 | Satake |
| 8,113,447 B1 * | 2/2012 | Giguere .................. B02C 9/02 241/11 |
| 8,404,298 B2 | 3/2013 | Ardnt et al. |

FOREIGN PATENT DOCUMENTS

| | | |
|---|---|---|
| EP | 0468774 A2 | 1/1992 |
| EP | 2661965 A1 | 11/2013 |
| JP | 4570595 B2 | 10/2010 |

\* cited by examiner

*Primary Examiner* — Subbalakshmi Prakash
(74) *Attorney, Agent, or Firm* — John Rizvi; John Rizvi, P.A.-The Patent Professor®

(57) ABSTRACT

A method of producing first break wheat which maintains wheat germ and wheat germ oil intact and surrounded in a protected state by endosperm includes milling wheat grains via a single pass through corrugated first break rollers thereby forming an amount of first break wheat, wherein the corrugated first break rollers are specifically designed to maintain wheat germ and wheat germ oil in the first break wheat intact and surrounded in a protected state by endosperm, and eliminating further processing of the first break wheat which exposes the wheat germ and wheat germ oil therein to the surrounding atmosphere. A first break wheat mixture is obtained by mixing first break wheat with white flour to obtain a first break wheat mixture including about 3% to about 50% by weight of first break wheat and about 50% to about 97% by weight of white flour.

1 Claim, 2 Drawing Sheets

METHOD OF PREPARING A FIRST BREAK WHEAT WHICH MAINTAINS WHEAT GERM INTACT AND SURROUNDED IN A PROTECTED STATE BY ENDOSPERM

CROSS-REFERENCE TO RELATED APPLICATION

This application claims the benefit of U.S. Provisional Patent Application Ser. No. 63/339,324 filed on May 6, 2022, which is incorporated by reference herein in its entirety.

FIELD OF THE INVENTION

The present invention relates generally to methods for enhancing the nutritive value of food products are provided. The disclosed methods comprise the manufacture and use of first break wheat comprising endosperm, wheat germ, and wheat germ oil, in a manner which prevents the damaging effects of oxidation of the wheat germ and/or the wheat germ oil, and of bread and leavened products in which it is incorporated. Also provided are methods of producing first break wheat and highly nutritive yeast-leavened and bakery products.

BACKGROUND OF THE INVENTION

Wheat is a cereal grain that belongs to the genus *Triticum* and that is widely cultivated for its seeds, 30,000 varieties of 14 species of wheat are grown around the world, as wheat is a rich source of carbohydrates, proteins, dietary fibers, manganese, phosphorus, vitamin B and niacin. The most commonly cultivated species of wheat include bread wheat or common wheat (*Triticum aestivum*); durum (*Triticum durum*), which is used to make semolina flour for pasta and bulgur; spelt (*Triticum spelta*), which is used in central Europe for bakery and brewery products; emmer (*Triticum turgidum* subsp. *dicoccum*), which is used in Mediterranean countries as whole grain for soups and bread; einkorn (*Triticum monococcum*), which is consumed primarily boiled for whole grain products and porridge; and Khorasan wheat (*Triticum turgidum* subsp. *turanicum*), which is mainly grown in the Middle East and used for bread.

The wheat grain in domesticated species of wheat is enclosed in a semi-brittle rachis, which breaks easily upon threshing and leads to the breaking of wheat ears into spikelets. As a consequence, further processing, such as milling or pounding, is needed to remove the husks and obtain the grains.

The wheat kernel has several components including: bran, which constitutes about 15% of the total grain, and has a firm, fibrous texture and is ordinarily not used in refined flour; endosperm, which constitutes about 82.5% of the total grain, and contains the wheat's starch; and germ, which constitutes about 2.5% of the total grain, and which is removed during traditional white flour refinement, but may be retained for use in some whole grain foods. The bran is made up of five layers, which covers the entire surface of the grain, and it is generally used for animal feed.

Milling is the process by which wheat is ground into flour, and it involves the removal of bran and wheat germ from the endosperm. The wheat germ is removed during traditional milling processes and, in some cases, it is retained for use in some grain and healthy foods after the oils are drained out, because wheat germ oils are extremely perishable when exposed to air and quickly become rancid during the milling and/or baking processes. The wheat grains are first cleaned to remove metals, impurities and any foreign materials, using various separators and rotating drums. Once the cleaning process is completed, the wheat is conditioned for about 8 to 24 hours by adding an amount of water under temperature and moisture conditions that induce toughening of the bran and mellowing of the endosperm to facilitate separation, and then the whole wheat grains are subjected to several cycles of grinding, sifting and blending to produce consistent end products.

The milling process is performed using corrugated and smooth roller mills or cylinders, known as "break rollers" or "smooth rollers", which are often made of cold steel. The rollers are paired and rotate inwardly against each other, moving at different speeds. The whole wheat grains are generally passed through a five or six roller mill or break sequential system, with each roller having finer corrugations than each preceding roller, e.g., about 12 corrugations per inch for a first break roller up to about 26 corrugations per inch for a fifth or sixth break roller, after which, the milled wheat is transferred to vibrating sifters to separate the grain components according to their size, ground and purified.

The traditional refining process is repeated until the endosperm is completely separated from the wheat grain, thereby resulting in a significant loss of nutrients. As a consequence, refined white flour must be enriched with iron, thiamine, riboflavin and niacin. On the other hand, the wheat germ, which is a high source of nutrients and anti-oxidants, including proteins, fibers, omega-3 fatty acids, phytosterols, niacin, thiamine, riboflavin, vitamin E, folate, magnesium, phosphorus, potassium, iron and zinc, and is enriched in poly-unsaturated fats, is a by-product of the milling process, with the wheat germ and wheat germ oil typically separated and removed by a third or fourth break roller, and its nutrients are routinely wasted in traditional flour refining processes. In particular, vitamin E in wheat germ is a powerful antioxidant that can protect cell membranes and neurons from free radical damage. The phytosterols in wheat germ lower unhealthy cholesterol, and wheat germ's omega-3 fatty acids help lower cholesterol and inflammation, and support a healthy nervous system, thus decreasing anxiety and improving mood. The addition of synthetic nutrients to refined white flour does not make up for the loss of phytonutrients which occurs in the milling process. Thus, although wheat is a major constituent in the human diet, foods processed for human consumption often fails to include the benefits of the nutritional value of wheat germ.

Provided herein are methods that enhance the nutritive value of refined white flour and produce highly nutritive breads and other yeast-leavened and bakery products. The disclosed methods comprise producing "first break" wheat, which maintains the wheat germ and wheat germ oil intact and surrounded in a protected state by the endosperm, and possibly some wheat bran, for use in making breads and other yeast-leavened and bakery products having substantial wheat germ content and its corresponding nutritional value, while preventing the damaging effects of oxidation and consequent rancidity of unprotected wheat germ.

Accordingly, there is an established need for a solution to one or more of the aforementioned shortcomings in the current state of the art.

SUMMARY OF THE INVENTION

The present invention is generally directed to a method for producing first break wheat comprising pure endosperm and natural wheat germ. The disclosed first break wheat is produced from wheat grains that are subjected to no more than one first break roll milling and are not exposed to additional roll milling and sieving. The corrugated first break rollers are specifically designed to maintain the wheat germ intact, completely surrounded and protected by the endosperm, which also remains intact, such that the wheat germ is not permitted to come into contact with air. As will be appreciated, by eliminating the exposure of the wheat germ to air, the damaging effects of oxidation and subsequent rancidity of the wheat germ are eliminated.

In most embodiments, the wheat grains are softened by treating, i.e., soaking the grains with 2% by weight of water added thereto to raise the normal moisture content of the wheat grains to about 16% by weight total, and allowing the grains to rest for about 8 hours to about 24 hours.

In at least one embodiment, an additional 0.25% by weight of water is added prior to the last hour of rest, e.g., at about 7 hours to about 23 hours into the rest period, to further raise the normal moisture content of the wheat grains prior to being subjected to corrugated first break roll milling.

The disclosed first break wheat comprises whole germ surrounded and protected from exposure to air by the endosperm, and is, thus, enriched in natural proteins, minerals, vitamin E, fiber, vitamins, and fatty acids. The first break wheat can be mixed with white flour to form a first break wheat mixture which may be used to make dough, from which yeast leavened and bakery products are produced.

Thus, in one embodiment, provided herein is a method of producing a first break wheat. The method comprises: milling wheat grains through first break rollers to obtain first break wheat, wherein the first break wheat is not subjected to additional roll milling and sieving, to obtain first break wheat germ and wheat germ oil surrounded and protected from air by the endosperm.

Additionally provided herein is a method of producing first break wheat comprising: milling wheat grains through first break rollers to obtain first break wheat, wherein the first break wheat is not subjected to additional roll milling and sieving; and, such that the first break wheat is enriched in pure endosperm and natural wheat germ and wheat germ oil containing germ proteins, minerals, vitamin E, fiber, vitamins, and fatty acids.

The methods provided herein allow the wheat germ to remain intact and protected in the endosperm of the first break wheat while in storage and throughout the baking process. The first break wheat produced according to the disclosed methods is enriched in pure endosperm and wheat germ, and has high consistency, pleasant flavor and aroma, high volume, soft texture and durability. The present first break wheat can be mixed with white flour in different proportions to obtain a first break wheat mixture. By way of example only, a first break wheat mixture may comprise about 3% to about 50% by weight of first break wheat, and about 50% to about 97% by weight of traditionally refined or processed white flour.

In additional embodiments, provided herein is a method of making dough enriched in wheat germ. The method comprises: (a) mixing first break wheat with white flour in a weight ratio of first break wheat to white flour of about 3:97 to about 50:50 to obtain a first break wheat mixture; (b) adding water, oil, yeast, sugar, salt and, optionally, one or more optional ingredients to the first break wheat mixture, and mixing all ingredient to produce a dough; and, (c) fermenting the dough for a period of time to let the dough rise as a result of carbon dioxide produced during the fermentation process.

The one or more optional ingredients may include, but are not limited to, one or more fruits, vegetables, seeds, cheese, meat, spices, and flavoring agents.

The dough thus produced contains intact wheat germ particles and wheat germ oil that are protected by pure endosperm, and thus is enriched in natural germ proteins, minerals, vitamin E, fiber, vitamins, and fatty acids, and has volume, smooth elastic texture, fresh taste and pleasant aroma and color.

The dough provided herein may be baked or fried to form bread, yeast-leavened products or bakery products, which are enriched in natural wheat germ proteins and pure endosperm, minerals, vitamin E, fiber, vitamins, and fatty acids, and have extended fresh taste and pleasant aroma and color.

Yeast-leavened and bakery products produced according to the disclosed methods include, but are not limited to, any type of bread, pizza, focaccia, pita, calzone, doughnuts, cake, and pastry. In some embodiments, the pizza is pizza with bubble-free pizza crust.

The disclosed yeast-leavened and bakery products are enriched in natural wheat germ proteins and pure endosperm, minerals, vitamin E, fiber, vitamins, and fatty acids, and have volume, smooth texture, fresh taste and pleasant aroma and color.

The foregoing and other features of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

Figure 1:
FIG. 1 is a black and white photograph showing the ingredients used to prepare the disclosed highly nutritive first break wheat bread: dry yeast; cold water; sugar; bread flour; first break wheat; oil; and salt.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following explanations of terms and methods are provided to better describe the present disclosure and to guide those of ordinary skill in the art in the practice of the present invention. As used herein. "comprising" means "including" and it is not intended to mean that the compositions and methods exclude elements that are not recited. "Consisting essentially of," when used to define compositions and methods, shall mean excluding other elements of any essential significance to the combination. For example, a composition consisting essentially of the elements as defined herein would not exclude other elements that do not materially affect the basic and novel characteristic(s) of the claimed invention. The singular forms "a," "an" and "the" include plural references unless the context clearly dictates otherwise. Thus, for example, a reference to "a compound" includes a plurality of compounds, and a reference to "a molecule" is a reference to one or more molecules. The term "or" refers to a single element of stated alternative elements or a combination of two or more elements, unless the context clearly indicates otherwise. For example, the phrase "A or B" refers to A. B. or a combination of both A and B. Furthermore, the various elements, features and steps discussed herein, as well as other known equivalents for each such element, feature or step, can be mixed and matched by one of ordinary skill in the art to perform methods in accordance with principles described herein. Among the various elements, features, and steps some will be specifically included and others specifically excluded in particular examples. All numerical designations, such as temperature, time, concentration, amounts, and weight, including ranges, are approximations which are varied (+) or (−) by 10%, 1%, or 0.1%, as appropriate. It is to be understood, although not always explicitly stated, that all numerical designations may be preceded by the term "about." It is also to be understood, although not always explicitly stated, that the ingredients described herein are merely exemplary and that equivalents of such are known in the art.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

In some examples, the numbers expressing quantities of ingredients, properties such as weight, reaction conditions, and so forth, used to describe and claim certain embodiments are to be understood as being modified in some instances by the term "about" or "approximately." For example, "about" or "approximately" can indicate +/−10%, 1%, or 0.1%, as appropriate, variation of the value it describes. Accordingly, in some embodiments, the numerical parameters set forth herein are approximations that can vary depending upon the desired properties for a particular embodiment. Notwithstanding that the numerical ranges and parameters setting forth the broad scope of some examples are approximations, the numerical values set forth in the specific examples are reported as precisely as practicable.

To facilitate review of the various embodiments of this disclosure, the following explanations of specific terms are provided:

About: A term used to indicate a variation in value by +/−10% of the value, or +/−5% of the value, or +/−1% of the value, or in some embodiments, by +/−0.1% of the value.

Agitate or Agitation: A mechanical movement that may include, but is not limited to, rotating, vibrating, vortexing, swirling, shaking, ultrasonicating, stirring, or any movement that causes mixing. Mechanical movements include movements performed by hand or by a rotator.

Amino Acids: Organic compounds containing an ammo functional group (—NH2) and a carboxyl functional group (—COOH), along with a side chain (—R group) specific to each amino acid. About 500 naturally occurring amino acids are known. They can be classified according to the core structural functional groups locations, such as, alpha- (a-), beta- (-), gamma- (y-) or delta- (δ-) amino acids, and/or their polarity, and/or their side chain group type (aliphatic, acyclic, aromatic, containing hydroxyl or sulfur, etc.). Nine proteinogenic amino acids are defined "essential amino acids" for humans because they cannot be produced from other compounds by the human body and must be taken in as food.

Anti-Oxidant: An active agent that inhibits oxidation or reactions promoted by oxygen or peroxides.

Contacting: Placement in direct physical association; includes both in solid and liquid form.

Emulsifier: A surfactant that reduces the interfacial tension between oil and water, minimizing the surface energy through formation of globules. Emulsifiers include gums, fatty acid conjugates and cationic, anionic and amphoteric surfactants capable of suspending the oily phase and stabilizing the emulsion by coating the oil droplets and avoiding the separation of the internal oily phase. The film coat produced by the emulsifier is a barrier between the immiscible phase and it also prevents droplets association, coagulation and coalescence.

Endosperm: A tissue produced in the seeds of most flowering plants following fertilization. The endosperm surrounds the embryo and provides nutrition in form of starches, oils and proteins. The endosperm of wheat grains are selectively retained during white flour processing, whereas the bran and wheat germ are removed. Endosperm purity is assessed by chemical imaging in the near infrared (NIR) region of the spectrum, by analysis of first break wheat streams, and/or by optical methods, such as the Pekar test and photoelectric colorimetric test.

Fat: Fats, also known as triglycerides, are esters of three fatty acid chains and glycerol, and they are typically solid at room temperature. Fats are generally hydrophobic, and are soluble in organic solvents and insoluble in water. Fats serve structural and metabolic functions. Saturated fats have no double bonds between the carbon atoms in the chain, whereas unsaturated fats have one or more double bonded carbon atoms in the chain.

First Break Wheat: Wheat grains which have been processed in a manner which maintains the endosperm intact in a surrounding relation to the wheat germ. i.e., the wheat grains are only processed through a first break roller, which necessarily maintains the wheat germ intact and protected from damaging exposure to air. The first break wheat may be mixed with regularly processed white flour, stoneground whole-meal flour, ground wheat flour, etc., thereby forming a first break wheat mixture and providing a source of natural proteins, minerals, vitamin E, fiber, vitamins, and fatty acids to the first break wheat mixture.

First Break Wheat Germ: Wheat germ obtained by the present inventive method wherein wheat grains are only processed through a first break roller so as to maintain the endosperm substantially intact and in a surrounding relation to the wheat germ, the endosperm thereby providing a protective barrier to prevent the surrounding air from contacting the wheat germ, thereby eliminating the oxidation and subsequent rancidity of the wheat germ. Thus, the first break wheat germ is present to impart the nutritional value of wheat germ to yeast-leavened and bakery products formed therewith.

First Break Wheat Mixture: A mixture of first break wheat obtained by the present inventive method, as described and disclosed herein, with any of a variety of flour products produced through traditional milling and grinding processes including, but not limited to, processed white flour, stone-ground whole-meal flour, ground wheat flour, etc., just to name a few.

Glutenins and Gliadins: Proteins that are essential components of gluten in wheat and that occur as multimeric aggregates of high and low molecular mass subunits held together by disulfide bonds. Glutenins provide the dough with strength and elasticity. Gliadins are essential for giving bread the ability to rise properly during baking.

Gluten: A protein complex consisting of prolamins and glutenins found in the germ of cereal grains, such as wheat. The gluten provides 75% to 85% of the total protein content in wheat. It has viscoelastic and adhesive properties, which make the dough elastic and help it rise. Gluten can trigger adverse inflammatory, immunological and autoimmune reactions in sensitive people, causing diseases, such as celiac disease, non-celiac gluten sensitivity, dermatitis herpetiformis, gluten ataxia and some neurological disorders, which can be controlled by a gluten-free diet.

Hydrophilic: A substance or compound that is capable of absorbing more than 10% by weight of water at 100% relative humidity (RH).

Hydrophobic: A substance or compound that is capable of absorbing no more than 1% by weight of water at 100% relative humidity (RH).

Hygroscopic: A substance or compound that is capable of absorbing more than 20% by weight of water at 100% relative humidity (RH).

Lipophilic: A substance or compound that has an affinity for a non-polar environment compared to a polar or aqueous environment.

Lyophilization: A low temperature dehydration process, which involves freezing a product, lowering pressure, and removing ice by sublimation. Pre-treatment may include concentrating the product, increasing the stability of the product by addition of excipients, or increasing the surface area. During the freezing stage, the material is cooled to the lowest temperature at which the solid, liquid and gas phases of the product can coexist.

Medium Chain Triglyceride (MCT) Oil: Triglycerides comprising fatty acids having an aliphatic chain of 6 to 12 carbon atoms.

Oil: Any fatty substance that is in viscous liquid form at room temperature (about 25° C.) and at atmospheric pressure (about 760 mmHg). Oils are hydrophobic and lipophilic, have a high carbon and hydrogen content and are usually flammable and surface active. Oils may be animal, vegetable, or petrochemical in origin, and may be volatile or non-volatile. Oils may be used for food, fuel, medical purposes, and for the manufacture of paints and plastics.

Oral: Oral administration includes any food, beverage, drink, pharmaceutical or nutraceutical formulation, baked good, and composition for administration through the mouth.

Protein: A naturally occurring or synthetic oligopeptide, polypeptide, gene product, expression product, or enzyme comprising an amino acid sequence, wherein the amino acids are joined to each other by peptide bonds or modified peptide bonds.

Under conditions sufficient to: A phrase that is used to describe any environment that permits the desired reaction to take place.

Viscosity: The measure of a fluid's resistance to gradual deformation by shear stress or tensile stress.

Yeast-Leavened Products: Products that are made from dough that uses yeast to rise. Yeast-leavened products include, but are not limited to, bread, pizza, focaccia, pita, doughnuts, pastry, and cakes.

Conventional millstone and hammer mill processing destroys the proteins in wheat, specifically, in the wheat germ which is separated and substantially removed. As a consequence, traditional white flour, stoneground whole-meal flour and ground wheat flour are devoid of proteins, and products made with traditional flour have low consistency and poor flavor.

Disclosed herein is a novel method of making first break wheat enriched in wheat germ and pure endosperm. The disclosed method comprises subjecting the wheat to corrugated first break rollers that are specifically designed to separate the bran from the endosperm and wheat germ to produce first break wheat at a point wherein the wheat grains just start opening, such that the wheat germ and wheat germ oil within the first break wheat remains intact and surrounded by the endosperm throughout the milling and baking process. In at least one embodiment, and by way of example only, first break rollers are specially designed to include about 12 deep Getchell teeth per inch arranged in a 1.25" spiral cut array on a first break roller having a diameter of about 10 inches and a length of about 38 inches, and wherein the first break rollers are arranged in a dull to dull orientation and operating at a differential speed ratio of about 2.5:1. This process ensures that all nutritional properties of the wheat germ and endosperm are maintained in the first break wheat.

The method disclosed herein provides that the first break wheat does not undergo a second roll milling and it is not sieved. Thus, the wheat germ, which represents 2.5% of the grain, is kept in its intact form and it remains protected by the endosperm, which constitutes 82.5% of the grain and surrounds it. Accordingly, the wheat germ is not sieved away and the endosperm is not broken, as in conventional flour milling. Rather, the wheat germ and endosperm remain together even when subjected to the humid environment created by the presence of water during the bread making process, because of the protection afforded by the endosperm, which remains pure. Once the dough is formed, the wheat germ is equally protected by the dough, which will later become bread, pizza, or other baked product.

The importance of wheat germ and gluten proteins in the bread making process has to date been underestimated. Yet, variations in both quantity and quality of gluten strongly determine variations in bread making performance.

Figure 2:
FIG. 2 is a black and white photograph showing wheat grain before (top of the figure) and after (bottom of the figure) processing through first break rollers, in accordance with the present invention.

Accordingly, also provided herein is a method of producing first break wheat that is enriched in germ and pure endosperm from the disclosed first break wheat. The method comprises: (a) milling wheat grains with corrugated first break rollers to obtain first break wheat, wherein the first break wheat is not subjected to additional roll milling and sieving; and (b) such that the first break wheat obtained is enriched in pure endosperm and natural wheat germ and wheat germ oil including germ proteins, minerals, vitamin E, fiber, vitamins, and fatty acids. The tray in the upper part of FIG. 2 is illustrative of wheat grains before a first break, and the tray in the lower part of FIG. 2 is illustrative of first break wheat obtained in accordance with the present invention, once again, wherein the wheat germ, and wheat germ oil therein, remain surrounded and protected by the endosperm.

The first break wheat thus obtained can be mixed with white flour in different proportions to form a first break wheat mixture with high consistency, elasticity, strength, flavor, volume, texture, aroma, and durability, and which is enriched in natural proteins, vitamins, minerals and nutrients. Thus, a mix may be formed, that contains about 3% to about 50% by weight of first break wheat and about 50% to about 97% by weight of white flour to obtain a first break wheat mixture enriched in wheat germ and pure endosperm, and having high consistency, pleasant flavor, high volume, soft texture, aroma, and durability. Such a mixture can then be used to prepare dough enriched in germ proteins, vitamins and minerals. For example, the first break wheat mixture is then combined with yeast for fermentation, mixed with additional conventional ingredients and, optionally, with additional cheese, meet, vegetable or fruit ingredients, to form dough.

The pure endosperm and the wheat germ add strength, consistency, softness and elasticity to the dough because of the high protein content and the gluten content. Therefore, the dough thus obtained has higher consistency, elasticity, softness and strength than the dough obtained using flour obtained by conventional milling.

The first break wheat dough, which is enriched with wheat germ and endosperm, can then be baked or fried to produce bread, pizza, focaccia, bakery products, and the like, with the desired properties of softness, volume, flavor, freshness and durability, and with all the health benefits of wheat germ.

The yeast-leavened and bakery products produced by the disclosed methods are enriched in natural proteins, minerals, vitamin E, fiber, vitamins, and fatty acids, and thus have antioxidant properties and help maintain a healthy digestion and a healthy heart, lower cholesterol and inflammation, improve skin, nail and hair consistency and texture, and enhance jovial mood and boost cognitive health.

The presence of pure endosperm in the first break wheat provides a soft mouth feel to the yeast-leavened and bakery products produced by the disclosed methods.

Moreover, the yeast-leavened and bakery products produced by the disclosed methods have no rancid taste, such as is attributed to the high perishability of wheat germ when exposed to air during the milling process. This is because the present method assures that wheat germ remains intact and protected by the endosperm throughout the first break milling process and by the dough during the bread or bakery making process, such that the wheat germ is not exposed to air. The protection afforded by the pure endosperm first, and by the dough later, prevents the wheat germ from breaking and releasing oils that would become rancid upon oxidation. Accordingly, the yeast-leavened and bakery products produced from dough containing first break wheat obtained from the present method have all the beneficial and healthy properties of intact wheat germ and pure endosperm, which are reflected in their form, volume, softness, flavor, and extended freshness.

Example 1: Bread Containing First Break Wheat Having High Nutritive Value and Long-Lasting Freshness The following ingredients were used to prepare a loaf of first break wheat bread according to the disclosed method: dry yeast (0.35 grams); sugar (7.0 grams): cold water (38° F., 74.0 grams); bread flour (100.0 grams); first break wheat (35.0 grams); oil (5 grams); and salt (2.0 grams), as shown by way of example in FIG. 1. No preservatives were added.

For comparison purposes, a conventional loaf of wheat bread was prepared with the following ingredients: dry yeast (0.35 grams); sugar (7.0 grams); cold water (38° F., 74.0 grams); bread flour (135.0 grams); oil (5 grams); and salt (2.0 grams). Again, no preservatives were added.

In accordance with the present example, yeast was added to the dry ingredients (sugar, salt, first break wheat and/or bread flour), and the dry mixture was added to a liquid mixture containing the water and oil in a mixing bowl. All ingredients were mixed with a mixer at medium speed for about 10 minutes, and the resultant dough was left to rest for about 15 minutes. The dough was then mixed again with a mixer at medium-high speed for about 5 minutes. The dough obtained from the first break wheat mixture containing first break wheat was fresh and very soft. The dough had a temperature of 61° F. and its consistency was suitable to be molded. The dough obtained from regular bread flour was also fresh, but harder to manipulate and mold. Both doughs were placed in a metal mold and left to rest at a temperature of about 61° F. to about 90° F. for about 1 hour and 45 minutes. Each dough was then baked for about 26 minutes at about 350° F.

The first break wheat bread thus obtained was highly nutritious as it was enriched in nutrients and minerals from the wheat germ and pure endosperm, and it had good volume, smooth texture, high consistency, softness and pleasant aroma and color. Moreover, the first break wheat bread had no rancid taste, which confirmed that the wheat germ, which is extremely perishable when exposed to air, was maintained intact and protected by the pure endosperm throughout the first break milling process and by the dough during the bread making process, such that the wheat germ was not exposed to air. This prevented the wheat germ from breaking and releasing oils that would become rancid upon oxidation. The bread prepared with conventional bread flour lacked the nutritious properties of the first break wheat bread.

Each loaf of bread was then sealed in plastic wrap and left at room temperature for several days. Each loaf of bread was checked daily for mold without opening the wrapper. Both loaves of bread started showing traces of mold on day 9. However, the bread prepared from first break wheat maintained its original nutritious flavor and softness for an extended period of time despite the lack of preservatives. This demonstrated that the presence of intact wheat germ in the first break wheat dough did not negatively affect the freshness of the bread when compared to bread prepared from conventional flour that contained no first break wheat germ.

Example 2: Vegetable Bread Containing First Break Wheat Having High NutritiveValue and Long-Lasting Freshness A loaf of first break wheat bread was prepared as described in Example 1, except a 5 gram mixture of cut vegetables comprising chopped carrots, sweet potatoes, spinach, broccoli and celery was added to the liquid mixture containing the water and oil in a mixing bowl prior to preparing the dough.

The first break wheat vegetable bread thus obtained was enriched in wheat germ nutrients and had good volume, softness, smooth texture, wonderful taste and pleasant aroma and color. The bread was sealed in plastic wrap and left at room temperature for several days. The bread was checked daily for mold without opening the wrapper. The bread prepared from first break wheat maintained its original freshness for an extended period of time despite the lack of preservatives. Furthermore, the addition of the vegetables did not affect its freshness, as the bread again only first started showing traces of mold on day 9.

Example 3: Fruit Bread Containing First Break Wheat Having High NutritiveValue and Long-Lasting Freshness A loaf of first break wheat bread was prepared as described in Example 1, except a 5 gram mixture of cut fruits comprising chopped apples, nuts and raisins was added to the liquid mixture containing the water and oil in a mixing bowl prior to preparing the dough.

The first break wheat fruit bread thus obtained was enriched in nutrients and had good volume, softness, smooth texture, wonderful taste and pleasant aroma and color. The bread was sealed in plastic wrap and left at room temperature for several days. The bread was checked daily for mold without opening the wrapper. The bread prepared from first break wheat maintained its original freshness for an extended period of time despite the lack of preservatives. Once again, the addition of the fruit did not affect its freshness, as the bread only first started showing traces of mold on day 9.

Example 4: Doughnuts Containing First Break Wheat Having High Nutritive Value and Long-Lasting Freshness The following ingredients were used to prepare first break wheat doughnuts according to the disclosed method: dry yeast (0.35 grams); sugar (40.0 grams); cold water (38° F. 80.0 grams); white flour (100.0 grams); first break wheat (35.0 grams); oil (15 grams); salt (2.0 grams). No preservatives were added.

For comparison, conventional wheat doughnuts were prepared with the following ingredients: dry yeast (0.35 grams); sugar (40.0 grams); cold water (38° F., 80.0 grams); white flour (135.0 grams); oil (15 grams); salt (2.0 grams). No preservatives were added.

In accordance with the present example, the yeast was added to the dry ingredients (sugar, salt, first break wheat and/or conventional white flour), and the dry mixture thus obtained was added to a liquid mixture containing the water and oil in a mixing bowl. All ingredients were mixed with a mixer at medium speed for about 10 minutes, and the dough thus obtained was left to rest for about 15 minutes. The dough was then mixed again with a mixer at medium-high speed for about 5 minutes. The dough obtained from the first break wheat was fresh and very soft. The dough had a temperature of 61° F. and its consistency allowed it to be easily moldable. The dough obtained from regular wheat flour was fresh, but harder to manipulate. Both doughs were rolled flat on a metal table, cut into round shapes and left to rest at about 90° F. for about 45 minutes. The circles of dough were then fried in deep oil, drained and coated with chocolate.

The first break wheat doughnuts obtained in accordance with this example were enriched in nutrients, and had good volume, smooth texture, fresh taste and pleasant aroma and color. No rancid taste was detected. This indicated that the wheat germ was maintained intact and protected by the endosperm throughout the first break milling process and by the dough during the bakery making process. The doughnuts prepared with regular wheat flour had low nutrient content.

Each doughnut was then sealed in plastic wrap and left at room temperature for several days, and checked daily for mold without opening the wrapper. The doughnuts prepared from first break wheat maintained high nutrient content throughout storage. The doughnuts prepared from first break wheat and the doughnuts prepared with conventional white flour maintained their original freshness for an extended period of time despite the lack of preservatives, and both types started showing traces of mold only on day 10. This demonstrated that the presence of first break wheat germ in the first break wheat dough did not negatively affect the freshness of the doughnuts when compared to the doughnuts prepared from conventional white flour that contained no first break wheat germ.

It should be recognized that illustrated embodiments are only examples of the disclosed product and methods, and should not be considered a limitation on the scope of the invention. Rather, the scope of the invention is defined by the following claims, and the present invention encompasses all that comes within the scope and spirit of the claims.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method of producing a first break wheat mixture comprising:
    milling an amount of wheat grain comprising wheat bran, endosperm, and wheat germ and wheat germ oil via a first break roll milling process, wherein the endosperm is retained in a surrounding relation to the wheat germ and the wheat germ oil such that the wheat germ and the wheat germ oil in a first break wheat are maintained intact and surrounded in a protected state from oxidation by the endosperm;
    eliminating a second roll milling process of the first break wheat thereby preventing oxidation of the wheat germ and wheat germ oil therein by oxygen in the surrounding atmosphere;
    eliminating sieving of the first break wheat thereby preventing oxidation of the wheat germ and wheat germ oil therein by oxygen in the surrounding atmosphere; and
    mixing a preselected amount of the first break wheat with a preselected amount of white flour to obtain the first break wheat mixture, wherein the preselected amount of first break wheat is about 3 percent to about 50 percent by weight of the first break wheat mixture, and the preselected amount of white flour is about 50 percent to about 97 percent by weight of the first break wheat mixture.

* * * * *